United States Patent
Mori

(10) Patent No.: US 9,242,382 B2
(45) Date of Patent: Jan. 26, 2016

(54) WRIST STRUCTURE UNIT OF INDUSTRIAL ROBOT

(71) Applicant: FANUC CORPORATION, Yamanashi (JP)

(72) Inventor: Masayoshi Mori, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 9 days.

(21) Appl. No.: 14/325,932

(22) Filed: Jul. 8, 2014

(65) Prior Publication Data

US 2015/0013491 A1     Jan. 15, 2015

(30) Foreign Application Priority Data

Jul. 10, 2013   (JP) .................................. 2013-144680

(51) Int. Cl.
    *B25J 17/00*       (2006.01)
    *B25J 17/02*       (2006.01)
    *B25J 9/10*        (2006.01)

(52) U.S. Cl.
    CPC .............. *B25J 17/0258* (2013.01); *B25J 9/102* (2013.01); *Y10T 74/20317* (2015.01)

(58) Field of Classification Search
    CPC .............................. B25J 9/102; B25J 17/0258
    USPC ...................... 74/414, 421 A, 490.06; 310/83
    See application file for complete search history.

(56) References Cited

U.S. PATENT DOCUMENTS

| 6,250,174 B1 | 6/2001 | Terada et al. |
|---|---|---|
| 8,335,612 B2 | 12/2012 | Tsuji |
| 2013/0333509 A1 | 12/2013 | Adachi |

FOREIGN PATENT DOCUMENTS

| JP | 61158456 | 10/1986 |
|---|---|---|
| JP | 06297377 | 10/1994 |
| JP | A 07-052074 | 2/1995 |
| JP | 10249755 | 9/1998 |
| JP | A 10-175188 | 6/2001 |
| JP | 2010042472 | 2/2010 |
| JP | 2010131712 | 6/2010 |
| JP | A 2014-000612 | 1/2014 |
| WO | 2010032493 | 3/2010 |

OTHER PUBLICATIONS

Japanese Office Action dated Dec. 2, 2014 for Japanese Application No. 2013-144680.

*Primary Examiner* — William C Joyce
(74) *Attorney, Agent, or Firm* — RatnerPrestia

(57) ABSTRACT

A spur gear deceleration mechanism unit (30) of a wrist structure unit is adapted to be driven in a first deceleration ratio structure or a second deceleration ratio structure. The first deceleration ratio structure uses at least a first spur gear (31) fitted onto an output shaft of a wrist inner frame driving motor (21) and a second spur gear (32) rotatably supported by a first auxiliary shaft (41). The second deceleration ratio structure uses at least the first spur gear, a first additional spur gear (51) rotatably supported by an additional auxiliary shaft (50), and a second additional spur gear (52) rotatably supported integrally with the first additional spur gear by the additional auxiliary shaft.

2 Claims, 5 Drawing Sheets

WRIST STRUCTURE UNIT OF INDUSTRIAL ROBOT

BACKGROUND OF THE INVENTION

1. Field of the Invention

The present invention relates to a wrist structure unit provided at a tip of an arm of an industrial robot.

2. Description of the Related Art

A wrist structure unit of an industrial robot includes a wrist machine frame and a wrist inner frame rotatable relative to the wrist machine frame. Various wrist elements, such as a hand and a tool, are attached to the wrist inner frame via a working tool attachment member. Rotation of an output shaft of a driving motor incorporated in the wrist machine frame is decelerated by a spur gear deceleration mechanism unit, thereby rotating the wrist inner frame relative to the wrist machine frame.

Japanese Laid-open Patent Publication No. 2014-000612 has disclosed a wrist structure unit that includes a decelerator chamber housing a spur gear deceleration mechanism unit that stores a driving motor in a wrist machine frame to form a driving force transmission mechanism and a wiring chamber housing wiring cables for supplying a driving power to the driving motor and transmitting and receiving control signals, in which the chambers are formed to be apart from each other. Accordingly, maintenance of the driving motor can be performed independently at the wiring chamber side via the wiring cables, thus ensuring easy maintenance.

Additionally, in the above Patent Publication, only a spur gear transmission mechanism allows deceleration and transmission by one wrist operation system of a wrist having a plurality of degrees of operational freedom. This structure can exclude a complicated deceleration mechanism in which a belt-pulley mechanism coexists, resulting in the reduction of production cost.

In the Patent Publication, the spur gear deceleration mechanism that consists of a three-stage spur gear train is arranged on one side of the wrist machine frame. A single-stage spur gear has a deceleration ratio ranging from 1:2.5 to 1:7 (about 4), so that the three-stage spur gear train can achieve a deceleration ratio of from 40 to 80. In addition, Japanese Laid-open Patent Publication No. H07-052074 discloses a spur gear deceleration mechanism. Furthermore, in Japanese Laid-open Patent Publication No. H10-175188, a fifth axis deceleration mechanism is also a spur gear deceleration mechanism whose driving motor is arranged in a wrist chamber.

However, in the spur gear deceleration mechanisms of Japanese Laid-open Patent Publication Nos. 2014-000612 and H07-052074 and the fifth axis deceleration mechanism of Japanese Laid-open Patent Publication No. 10-175188, when deceleration ratio needs to be changed due to a change in specifications, such as an increase in portable mass, design changes such as the preparation of a new wrist machine frame are needed.

The present invention has been accomplished in view of such circumstances. It is an object of the present invention to provide a wrist structure unit that can easily change deceleration ratio without newly forming a wrist machine frame.

SUMMARY OF THE INVENTION

In order to achieve the object described above, according to a first aspect of the present invention, there is provided a wrist structure unit connected to a tip of an arm of a robot and having a plurality of degrees of operational freedom, the wrist structure unit including: a wrist housing machine frame that forms different wrist chambers separated from each other in a wrist machine frame; a wrist inner frame that is rotatably retained in a first one of the wrist chambers; a wrist inner frame driving motor that is arranged in a second one of the wrist chambers such that an output shaft of the motor is parallel to a rotational axis of the wrist inner frame and drives the wrist inner frame; a driving motor different from the wrist inner frame driving motor, the driving motor being housed in the wrist inner frame and outputting a rotational output orthogonal to the rotational axis of the wrist inner frame; a cover that covers one side of the wrist housing machine frame to form a decelerator chamber; and a spur gear deceleration mechanism unit that is arranged in the decelerator chamber and includes a multi-stage spur gear train for decelerating and transmitting rotational power applied from the output shaft of the wrist inner frame driving motor to the wrist inner frame, the spur gear deceleration mechanism unit being adapted to be driven in a first deceleration ratio structure or a second deceleration ratio structure, in which in the first deceleration ratio structure, the wrist inner frame driving motor is attached to a first attachment position in the second wrist chamber; the first deceleration ratio structure is adapted to use at least a first spur gear attached to the output shaft of the wrist inner frame driving motor and a second spur gear rotatably supported by a first auxiliary shaft attached to the wrist housing machine frame, having a larger diameter than the first spur gear, and engaging with the first spur gear; in the second deceleration ratio structure, the wrist inner frame driving motor is attached to a second attachment position, which is located farther from the wrist inner frame than the first attachment position, in the second wrist chamber; and the second deceleration ratio structure is adapted to use at least the first spur gear, a first additional spur gear rotatably supported by an additional auxiliary shaft supported by a support member between the output shaft of the wrist inner frame driving motor and the first auxiliary shaft, having a larger diameter than the first spur gear, and engaged with the first spur gear, and a second additional spur gear rotatably supported integrally with the first additional spur gear by the additional auxiliary shaft, having a smaller diameter than the first additional spur gear, and engaged with the second spur gear.

According to a second aspect of the present invention, in the first aspect, in the second deceleration ratio structure, the output shaft of the wrist inner frame driving motor and the additional auxiliary shaft are arranged in a common single through hole passing through the wrist housing machine frame of the wrist machine frame.

According to a third aspect of the present invention, in the first or the second aspect, the first deceleration ratio structure includes a three-stage spur gear train and the second deceleration ratio structure includes a four-stage spur gear train.

A detailed description of typical embodiments of the present invention depicted in the attached drawings will further clarify the object, characteristics, and advantages of the invention, as well as other objects, characteristics, and advantages thereof.

DETAILED DESCRIPTION

Figure 1:
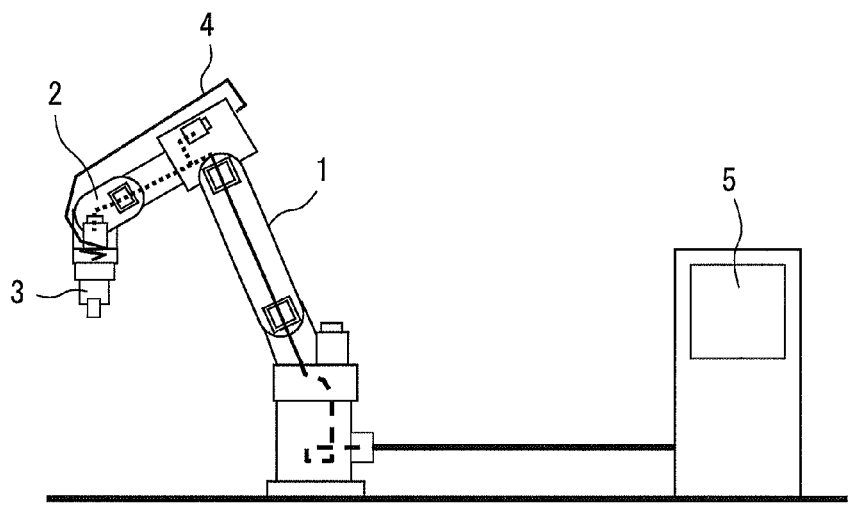
FIG. 1 is a view depicting an entire structure of a robot provided with a wrist structure unit according to the present invention.

Hereinafter, embodiments of the present invention will be described with reference to the attached drawings. Throughout the drawings below, the same reference numerals are used to refer to the same elements. For easier understanding, the drawings are provided in different scales as necessary.

FIG. 1 is a view depicting an entire structure of a robot provided with a wrist structure unit according to the present invention. A robot 1 depicted in FIG. 1 is a six-axis vertically articulated robot. A wrist 2 located at a tip of the robot 1 is mounted with six degrees of freedom. Each of the axes of the robot 1 incorporates a servo motor (not shown in FIG. 1) for driving the each axis. The servo motors are connected to a robot controller 5 by control cables extending from the respective servo motors, which are controlled by the robot controller 5.

As depicted in FIG. 1, a working tool 3, such as a gripper or a welding torch, is attached to a tip of the wrist 2 of the robot 1. The working tool 3 is used to hold and carry a component or weld a workpiece. A working tool wire body 4 depicted in FIG. 1 is used to supply electric power, air, or the like to the working tool 3.

Figure 2:
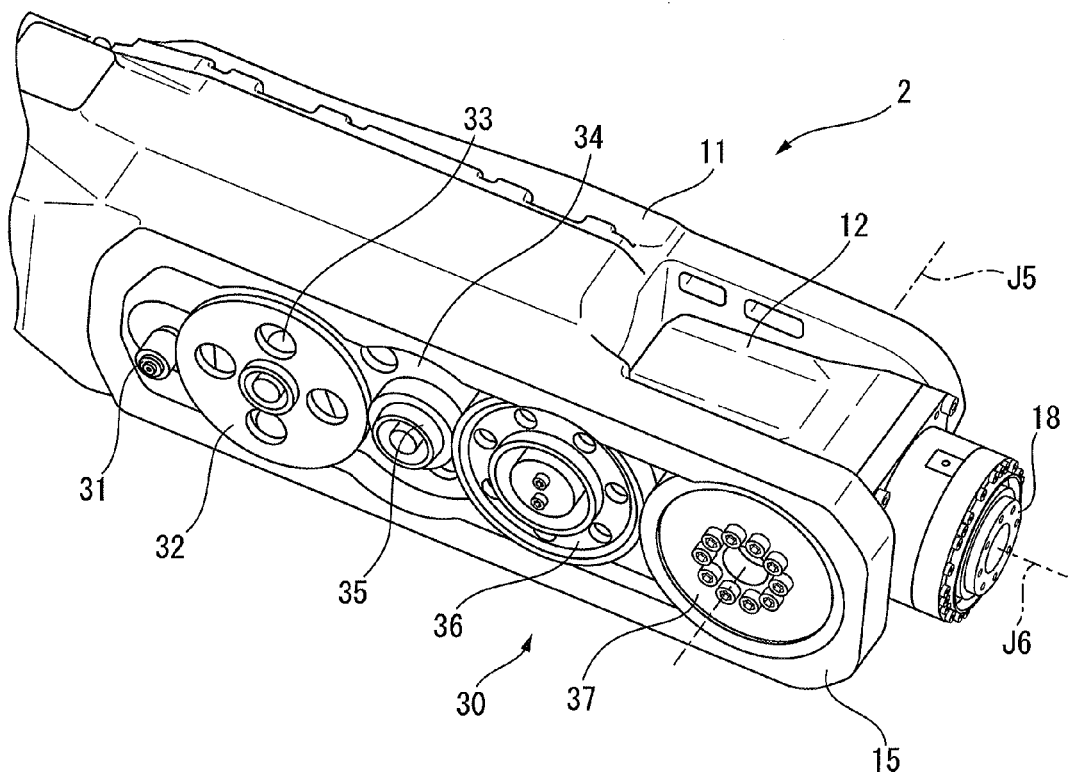
FIG. 2 is a perspective view of a wrist structure unit in a first deceleration ratio structure according to the present invention.

FIG. 2 is a perspective view of the wrist structure unit according to the present invention. In FIG. 2, the wrist 2 mainly includes a wrist machine frame 11 and a wrist inner frame 12 attached to the wrist machine frame 11 rotatably around an axis J5. The wrist inner frame 12 is provided with a working tool attachment unit 18, which is rotationally driven together with the working tool 3 (not shown in FIG. 2) around an axis J6.

In addition, as depicted in FIG. 2, a cover 15 is attached to one side of the wrist machine frame 11. The cover 15 is slightly curved outward. A spur gear deceleration mechanism unit 30 is arranged between the cover 15 and the wrist machine frame 11.

Figure 3A:
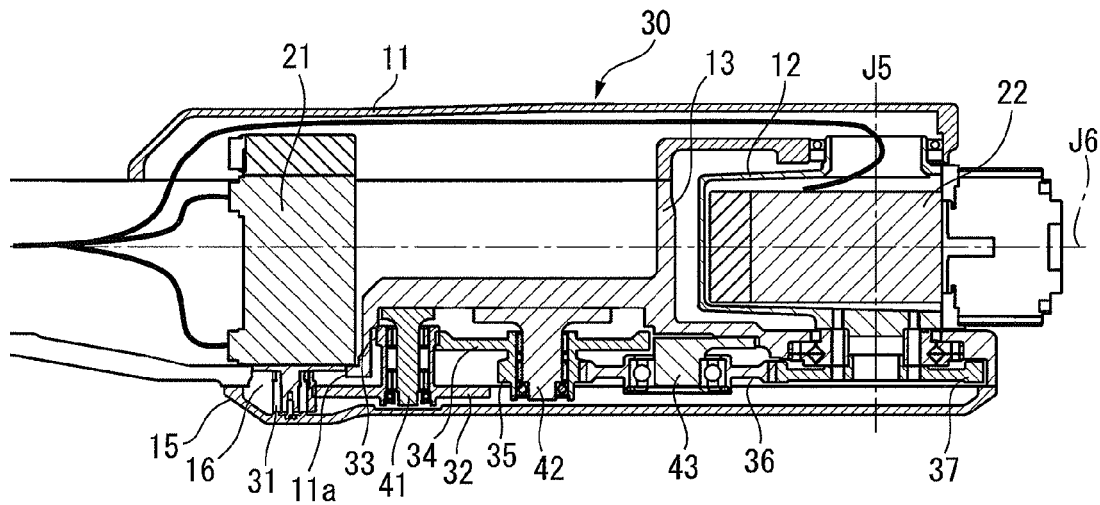
FIG. 3A is a sectional view of the wrist structure unit in the first deceleration ratio structure according to the present invention.
Figure 3B:
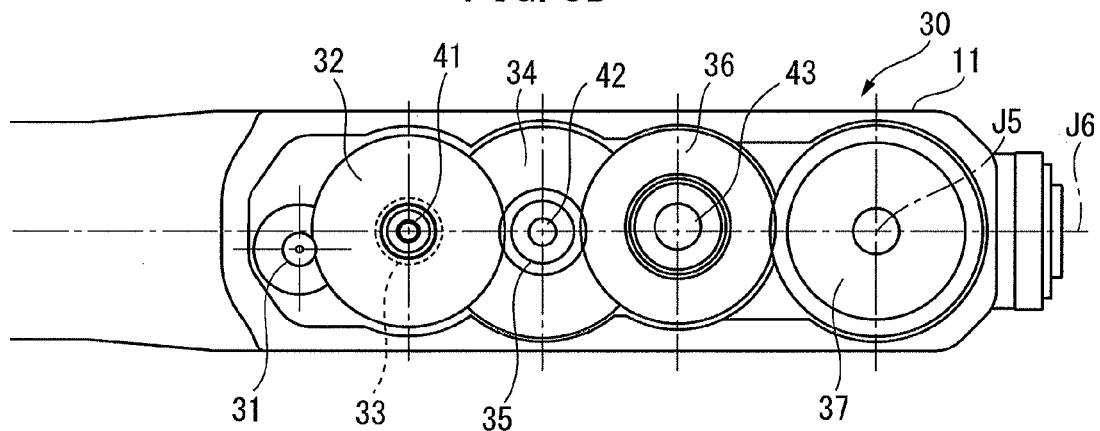
FIG. 3B is a side view depicting a state of the wrist structure unit depicted in FIG. 3A in which a cover of the wrist structure unit has been removed.

FIG. 3A is a sectional view of a wrist structure unit in a first deceleration ratio structure according to the present invention, and FIG. 3B is a side view depicting a state of the wrist structure unit depicted in FIG. 3A in which the cover has been removed. Hereinafter, a description will be given of the spur gear deceleration mechanism unit 30 in the first deceleration ratio structure, with reference to FIGS. 2 to 3B.

As depicted in FIG. 3A, a wrist housing machine frame 13 is arranged in the wrist machine frame 11. As can be seen from FIG. 3A, the wrist housing machine frame 13 partitions an inside of the wrist machine frame 11 into a plurality of wrist chambers. Then, in a first one of the wrist chambers, the wrist inner frame 12 is arranged rotatably around the axis J5. As depicted in the drawing, a driving motor 22 for driving the working tool 3 (not shown in FIG. 3A) is arranged in the wrist inner frame 12.

In addition, a wrist inner frame driving motor 21 for rotationally driving the wrist inner frame 12 is arranged in a second chamber thereof. As depicted in FIG. 3A, the wrist inner frame driving motor 21 is located such that an output shaft thereof is vertical to a center axis line (the same as the axis J6 in FIG. 3A) of the wrist 2. As can be seen from FIG. 3A, the wrist inner frame driving motor 21 is located in a first attachment position adjacent to the wrist housing machine frame 13.

Furthermore, the one side of the wrist housing machine frame 13 is covered with the cover 15. A space between the cover 15 and the one side of the wrist housing machine frame 13 is a decelerator chamber 16, in which the spur gear deceleration mechanism unit 30 is arranged.

In FIG. 3A, the first deceleration ratio structure is a three-stage structure, and the spur gear deceleration mechanism unit 30 mainly includes a first spur gear 31 to a seventh spur gear 37 and a first auxiliary shaft 41 to a third auxiliary shaft 43. As depicted in FIG. 3A, the first spur gear 31 is attached to the output shaft of the wrist inner frame driving motor 21. In addition, on the one side of the wrist housing machine frame 13, the first auxiliary shaft 41, the second auxiliary shaft 42, and the third auxiliary shaft 43 are arranged parallel to the output shaft of the wrist inner frame driving motor 21. As can be seen from FIG. 3A, the first to the third auxiliary shafts 41 to 43 are vertical to the center axis line of the wrist 2.

A second spur gear 32 is rotatably supported by the first auxiliary shaft 41 and engaged with the first spur gear 31. As depicted in FIG. 3A and the like, the second spur gear 32 has a larger diameter than the first spur gear 31, and in an embodiment, the diameter of the second spur gear 32 is about seven times the diameter of the first spur gear 31.

As can be seen from FIGS. 3A and 3B, the third spur gear 33 integrated with the second spur gear 32 is rotatably supported by the first auxiliary shaft 41. As depicted in FIG. 3A, the third spur gear 33 is located closer to the center axis line of the wrist 2 than the second spur gear 32.

In addition, the diameter of the second spur gear 32 is larger than that of the third spur gear 33, and in an embodiment, the diameter of the second spur gear 32 is about four times the diameter of the third spur gear 33. Then, the third spur gear 33 is engaged with a fourth spur gear 34 rotatably supported by the second auxiliary shaft 42.

As seen from FIGS. 3A and 3B, a fifth spur gear 35 integrated with the fourth spur gear 34 is rotatably supported by the second auxiliary shaft 42. As depicted in FIG. 3A, the fifth spur gear 35 is located farther from the center axis line of the wrist 2 than the fourth spur gear 34.

Additionally, the fourth spur gear 34 has a lager diameter than the fifth spur gear 35, and in an embodiment, the diameter of the fourth spur gear 34 is about 2.5 times the diameter of the fifth spur gear 35. The fifth spur gear 35 is engaged with a sixth spur gear 36 rotatably supported by the third auxiliary shaft 43. The sixth spur gear 36 serves as an idler gear.

Furthermore, as can be seen from FIGS. 3A and 3B, a seventh spur gear 37 is rotatably supported around the rotational axis J5 of the wrist inner frame 12. The seventh spur gear 37 is engaged with the sixth spur gear 36. Rotation of the sixth spur gear 36 is transmitted to the seventh spur gear 37 to rotate the wrist inner frame 12 around the rotational axis J5, so that the seventh spur gear 37 serves as an output spur gear.

Upon operation, driving torque of the wrist inner frame driving motor 21 is transmitted to the second spur gear 32 through the first spur gear 31. Then, the driving torque is transmitted to the fourth spur gear 34 through the third spur gear 33 integrated with the second spur gear 32. Then, the driving torque is transmitted to the sixth spur gear 36 through the fifth spur gear 35 integrated with the fourth spur gear 34 and then to the seventh spur gear 37 through the sixth spur gear 36. In this manner, the driving torque of the wrist inner frame driving motor 21 is transmitted to the seventh spur gear 37 to rotate the wrist inner frame 12 around the rotational axis J5.

An output shaft of the driving motor 22 arranged in the wrist inner frame 12 is connected to another decelerator that is not shown. A driving force of the driving motor 22 is decelerated to rotationally drive the working tool attachment unit 18. The another decelerator may be incorporated in the working tool attachment unit 18. The driving motor 22 is often configured to have the same size as that of the wrist inner frame driving motor 21 due to specifications of the output shaft thereof. A length of the driving motor 22 in a direction of the axis J6 is substantially equal to the diameter of the seventh spur gear 37.

In the present invention, the seventh spur gear 37 as the output spur gear is engaged with the sixth spur gear 36 as the idler gear. Additionally, the fifth spur gear 35 having a small diameter is engaged with the sixth spur gear 36 on a side opposite to the position of the engagement between the seventh spur gear 37 and the sixth spur gear 36. Due to this structure, the fourth spur gear 34 integrated with the fifth spur gear 35 can be located closer to the center axis line of the wrist than the first spur gear 31, and the fifth spur gear 35 can be located farther from the center axis line of the wrist.

As a result, a distance between the wrist housing machine frame 13 and the cover 15 covering the deceleration chamber 16 can be minimized. In other words, in the present invention, a width of the wrist machine frame 11 in a direction of the rotational axis J5 of the wrist inner frame 12 can be made small.

Figure 3C:
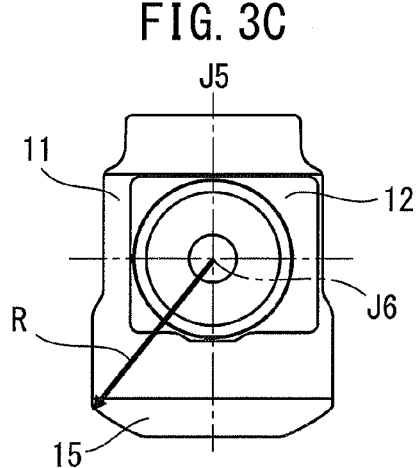
FIG. 3C is an end face view seen from a wrist tip of the wrist structure unit depicted in FIG. 3A.

FIG. 3C is an end face view seen from the wrist tip of the wrist structure unit depicted in FIG. 3A. As depicted in FIG. 3C, a distance to a part of the cover 15 located farthest from the axis J6 is an interference radius R of the wrist 2. In the present invention, due to the structure as described above, the wrist machine frame 11 can be made smaller in the direction of the rotational axis J5, as a result of which the cover 15 can also be made smaller in the rotational axis J5 direction.

In addition, the diameter of the first spur gear 31 is determined by the number of teeth of the spur gear and the size of the teeth shape thereof (hereinafter referred to as module), and the diameter of the second spur gear 32 engaged with the first spur gear 31 is determined by a speed ratio relative to the first spur gear 31. Since the modules of gears engaged with each other are preferably the same, the speed ratio is a ratio between the number of teeth of the first spur gear 31 and the number of teeth of the second spur gear 32. In order to reduce the diameter of the second spur gear 32 to minimize a height of the cover 15, the speed ratio should be reduced by reducing the number of teeth of the second spur gear 32 or the diameter of the first spur gear 31 should be reduced. Reduction of the speed ratio causes the reduction of output torque, whereas the reduction of the diameter of the first spur gear 31 causes the reduction of the module, leading to the shortage of tooth surface strength. Typically, the number of teeth on the first spur gear 31 is determined to be a minimum number of teeth based on the diameter of the shaft of the wrist inner frame driving motor 21 and the module.

Additionally, preferably, the wrist inner frame 12 integrated with the driving motor 22 and the working tool attachment unit 18 is arranged such that a longitudinal center thereof is positioned on the rotational axis J5, which is because of balancing for the wrist inner frame 12. In other words, outward protrusion of the wrist inner frame 12 in the direction of the J6 axis makes it difficult to attach the heavy working tool 3 to the working tool attachment unit 18. Conversely, inward retraction of the wrist inner frame 12 in the direction of the axis J6 causes the wrist inner frame 12 to easily interfere with the working tool wire body 4. For this reason, preferably, the third auxiliary shaft 43 of the sixth spur gear 36 engaged with the seventh spur gear 37 is positioned in a place corresponding to a rear end of the driving motor 22, as depicted in FIG. 3A.

Furthermore, in order to reduce the interference radius R depicted in FIG. 3C, the width of the wrist inner frame 12 in the direction of the rotational axis J5 is also minimized, and the seventh spur gear 37 is arranged close to the center axis line of the wrist. This structure should include the sixth spur gear 36 as the idler gear. Thus, when the sixth spur gear 36 is excluded, the fourth spur gear 34 should be located far from the center axis line of the wrist 2, as in the conventional art.

Therefore, in the present invention, the interference radius R from the axis J6 can be small while maintaining advantages of the spur gear deceleration mechanism unit 30, such as easy maintenance, a simple structure, and reduction of production cost.

Figure 4:
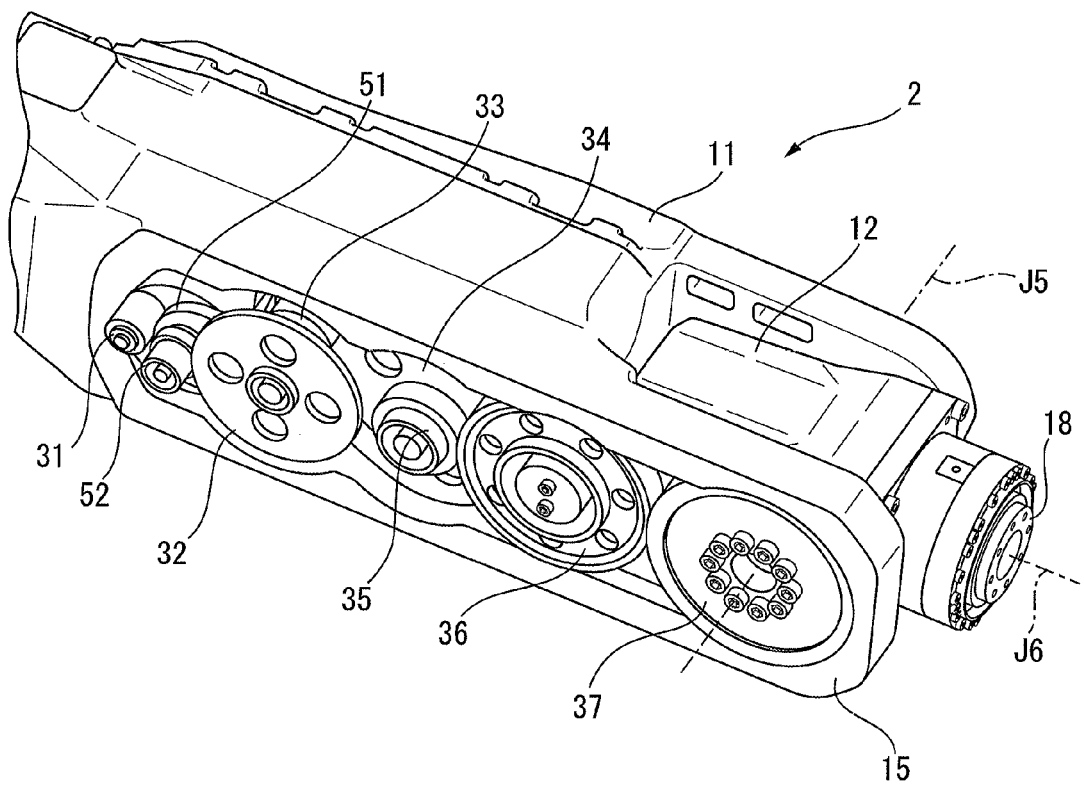
FIG. 4 is a perspective view of a wrist structure unit in a second deceleration ratio structure according to the present invention.
Figure 5A:
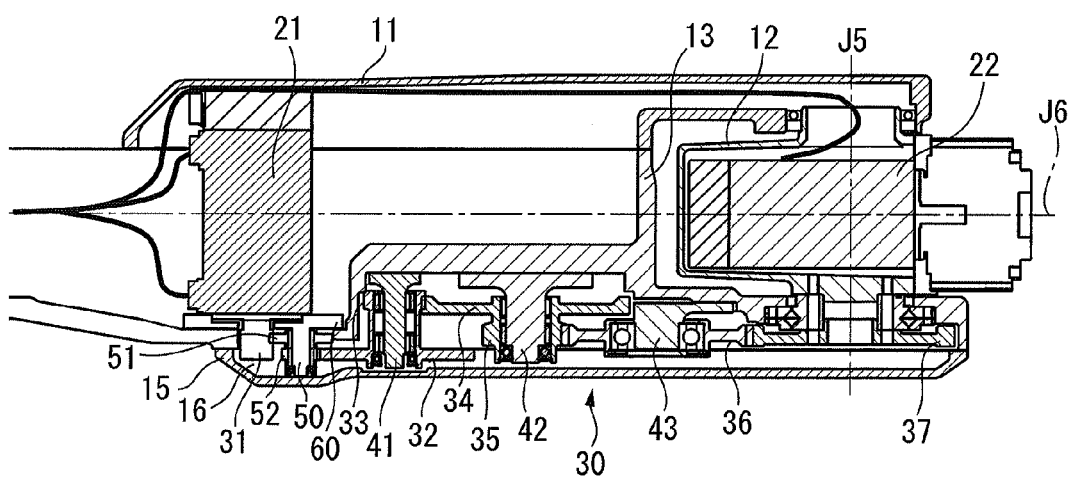
FIG. 5A is a sectional view of the wrist structure unit in the second deceleration ratio structure according to the present invention.
Figure 5B:
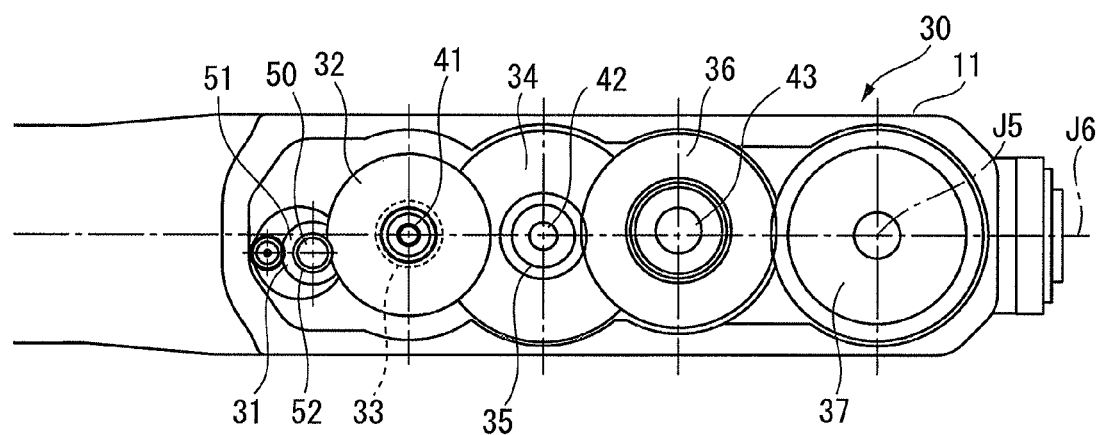
FIG. 5B is a side view depicting a state of the wrist structure unit depicted in FIG. 5A in which a cover of the wrist structure unit has been removed.
Figure 5C:
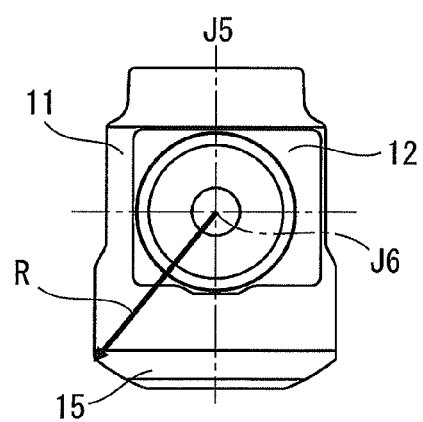
FIG. 5C is an end face view seen from a wrist tip of the wrist structure unit depicted in FIG. 5A.

FIG. 4 is a perspective view of a wrist structure unit in a second deceleration ratio structure according to the present invention. FIG. 5A is a sectional view of the wrist structure unit in the second deceleration ratio structure according to the present invention; FIG. 5B is a side view of the wrist structure unit depicted in FIG. 5A in which the cover has been removed; and FIG. 5C is an end face view of the wrist structure unit depicted in FIG. 5A seen from the wrist tip thereof. Hereinafter, a description will be given of a spur gear deceleration mechanism unit 30 in the second deceleration ratio structure with reference to FIGS. 4 to 5C.

As depicted in FIG. 4, the second deceleration ratio structure is a four-stage structure, in which the spur gear deceleration mechanism unit 30 includes, in addition to a first spur gear 31 to a seventh spur gear 37 and a first auxiliary shaft 41 to a third auxiliary shaft 43, a first additional spur gear 51, a second additional spur gear 52, and an additional auxiliary shaft 50.

As depicted in FIG. 5A, in the second deceleration ratio structure, a wrist inner frame driving motor 21 is arranged on a further left side than the position of the wrist inner frame driving motor 21 depicted in FIG. 3A in the second wrist chamber. In other words, the wrist inner frame driving motor 21 is arranged farther than the position depicted in FIG. 3A when seen from the wrist inner frame 12. This position is referred to as a second attachment position.

Furthermore, in the second deceleration ratio structure, the additional auxiliary shaft 50 is arranged between an output shaft of the wrist inner frame driving motor 21 and the first auxiliary shaft 41. The additional auxiliary shaft 50 is arranged parallel to the output shaft of the wrist inner frame driving motor 21 and the first auxiliary shaft 41 by a support member 60.

As can be seen from the drawing, the first additional spur gear 51 is rotatably supported by the additional auxiliary shaft 50 and engaged with the first spur gear 31. As depicted in FIG. 5A and the like, the first additional spur gear 51 has a larger diameter than the first spur gear 31, and in an embodiment, the diameter of the first additional spur gear 51 is about 1.5 times the diameter of the first spur gear 31.

As can be seen from FIGS. 5A and 5B, the second additional spur gear 52 integrated with the first additional spur gear 51 is rotatably supported by the additional auxiliary shaft 50. As depicted in FIG. 5A, the first additional spur gear 51 is located closer to the center axis line of the wrist 2 than the second additional spur gear 52. In addition, the second additional spur gear 52 is engaged with the second spur gear 32.

Accordingly, in the second deceleration ratio structure, the support member 60 provided with the additional auxiliary shaft 50 and the first and the second additional spur gears 51 and 52 are added to the first deceleration ratio structure. The change from the first deceleration ratio structure to the second deceleration ratio structure is as follows.

First, the cover 15 and a part of the wrist machine frame 11 are removed, and then the wrist inner frame driving motor 21 is moved, in the second wrist chamber, to the left from the first attachment position depicted in FIG. 3A to the second attachment position depicted in FIG. 5A. Then, a flat portion 61 (see FIG. 6A) of the support member 60 is arranged in the second wrist chamber and the additional auxiliary shaft 50 of the support member 60 is extended into the decelerator chamber 16. In this case, the support member 60 is arranged such that the additional auxiliary shaft 50 is positioned between the output shaft of the wrist inner frame driving motor 21 and the first auxiliary shaft 41.

After that, the first and the second additional spur gears 51 and 52 integrally formed with each other are rotatably attached to the additional auxiliary shaft 50. Lastly, the removed part of the wrist machine frame 11 is returned onto the initial place and the cover 15 is attached again.

In this manner, the first deceleration ratio structure can be changed to the second deceleration ratio structure. In the second deceleration ratio structure, the first and the second additional spur gears 51 and 52 are added between the first and the second spur gears 31 and 32. Accordingly, the second deceleration ratio structure can provide a deceleration ratio different from that of the first deceleration ratio structure.

In order to quickly change the first deceleration ratio structure to the second deceleration ratio structure, a through hole 11a in the wrist machine frame 11 for inserting the output shaft of the wrist inner frame driving motor 21 is preferably large and is larger than the first spur gear 31, as depicted in FIG. 3A. Therefore, as depicted in FIG. 5A, both the output shaft of the wrist inner frame driving motor 21 and the additional auxiliary shaft 50 of the support member 60 can be easily arranged in the through hole 11a that is common to both shafts.

Accordingly, in the present invention the shape of the wrist machine frame 11 between the first deceleration ratio structure and the second deceleration ratio structure does not need to change. Then, only with the addition of the minimum necessary components, the change between the first and the second deceleration ratio structures can be made. Therefore, when the working tool 3 of the robot 1 is a gripper, either the first or the second deceleration ratio structure can be selected depending on portable weight required in the gripper. In addition, the advantages of the spur gear deceleration mechanism unit 30, such as easy maintenance work, simple structure, and production cost reduction, can be maintained.

The second deceleration ratio structure may use a second spur gear 32' having a diameter different from the diameter of the second spur gear 32 depicted in FIG. 3A. In this case, it will be understood that the deceleration ratio in the wrist structure unit of the second deceleration ratio structure can be further optimized. For example, the diameter of the first additional spur gear 51 may be about twice the diameter of the first spur gear 31, the diameter of the second spur gear 32' may be about five times the diameter of the second additional spur gear 52, so that, as a whole, the deceleration ratio of the second deceleration ratio structure can be 1.5 times the first deceleration ratio structure.

Figure 6A:
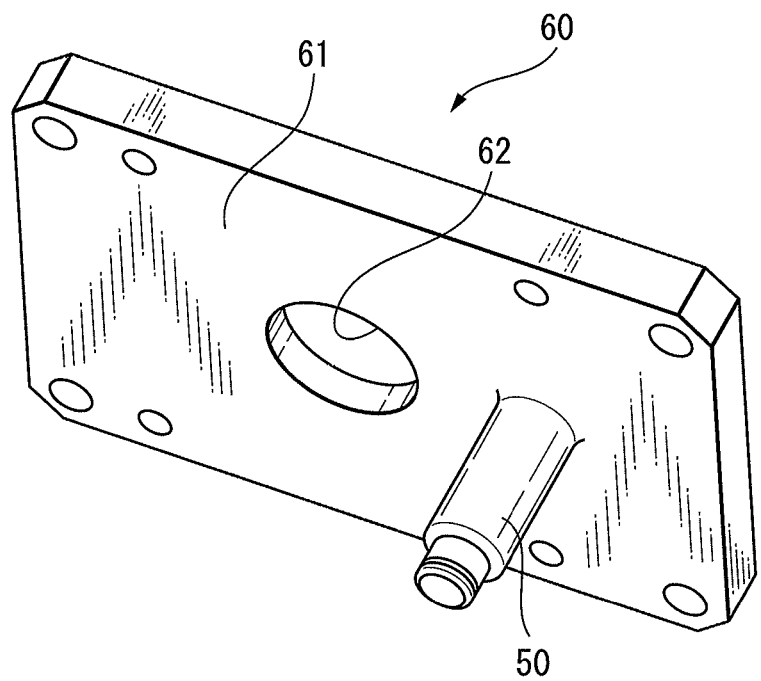
FIG. 6A is a perspective view of a support member.

FIG. 6A is a perspective view of a support member. As depicted in FIG. 6A, a support member 60 includes a flat portion 61 retaining the wrist inner frame driving motor 21 and the additional auxiliary shaft 50 provided with the first additional spur gear 51 and the like. The output shaft of the wrist inner frame driving motor 21 is configured to pass through an opening portion 62 formed in the flat portion 61. In FIG. 6A, the flat portion 61 and the additional auxiliary shaft 50 are formed as an integrated member.

Figure 6B:
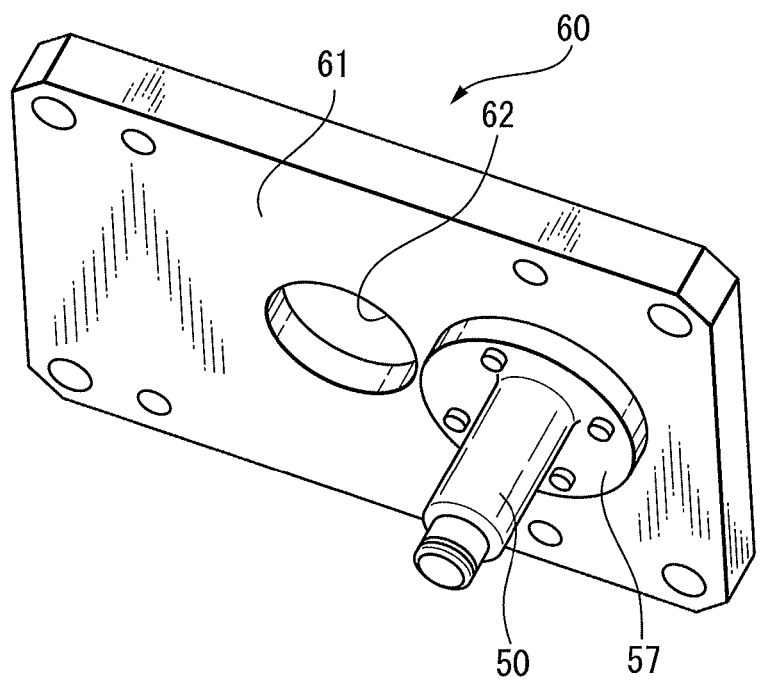
FIG. 6B is a perspective view of another support member.

FIG. 6B is a perspective view of another support member. FIG. 6B depicts a support member 60 provided with a flat portion 61 and an additional auxiliary shaft 50 that are formed as different members. As depicted in FIG. 6B, a flange 57 is provided at a base end of the additional auxiliary shaft 50, and then, the flange 57 is screwed onto the flat portion 61 to fix the additional auxiliary shaft 50 to the flat portion 61.

The opening portion 62 of the support member 60 depicted in each of FIGS. 6A and 6B serves to facilitate the installation of the wrist inner frame driving motor 21. In addition, the flat portion 61 of the support member 60 serves to prevent a lubricant, such as grease, present in the decelerator chamber 16 of the wrist housing machine frame 13 from entering the second wrist chamber.

In this regard, the first deceleration ratio structure depicted in FIG. 3A has a relatively wide space between a rear end of the wrist inner frame driving motor 21 and an inner wall of the wrist machine frame 11. In addition, the second deceleration ratio structure depicted in FIG. 5A has a space between a rear end of the wrist inner frame driving motor 21 and an inner wall of the wrist machine frame 11 that is narrower than the space depicted in FIG. 3A.

Similarly, the second deceleration ratio structure depicted in FIG. 5A has a relatively wide space between a tip of the output shaft of the wrist inner frame driving motor 21 and an inner wall of the cover 15. Additionally, the first deceleration ratio structure depicted in FIG. 3A has a space between a tip of the output shaft of the wrist inner frame driving motor 21 and an inner wall of the cover 15 that is narrower than the space depicted in FIG. 5A.

The reason for the presence of the spaces is that the wrist inner frame driving motor 21 is located in a direction away from the cover 15 by a distance corresponding to a thickness of the flat portion 61 of the support member 60 in the second deceleration ratio structure. In other words, the space between the rear end of the wrist inner frame driving motor 21 and the inner wall of the wrist machine frame 11 depicted in FIG. 3A and the space between the tip of the output shaft of the wrist inner frame driving motor 21 and the inner wall of the cover 15 depicted in FIG. 5A are sufficiently larger than a thickness of the flat portion 61 of the support member 60.

Due to the presence of the spaces, the change between the first deceleration ratio structure and the second deceleration ratio structure can be made without changing the shape of the wrist machine frame 11. It can be seen that in order to retain the space between the tip of the output shaft of the wrist inner frame driving motor 21 and the inner wall of the cover 15 depicted in FIG. 5A, the cover 15 is partially protruding outward at a position near the wrist inner frame driving motor 21.

Additionally, in the first deceleration ratio structure of the present invention, a deceleration ratio between the first and the second spur gears 31 and 32, a deceleration ratio between the second and the third spur gears 32 and 33, and a deceleration ratio between the third and the fourth spur gears 33 and 34 are all about 1:4. In other words, the speed ratios between the spur gears are set to be substantially equal to each other. In this case, the entire spur gear transmission mechanism unit 30 has a deceleration ratio of 64. Accordingly, when the wrist inner frame driving motor 21 has a maximum number of revolutions of 5000 rpm, the rotational axis J5 can have a maximum speed of 400 deg/sec.

Furthermore, in the second deceleration ratio structure of the present invention, the deceleration ratio between the first spur gear 31 and the first additional spur gear 51 is about 1:1.5 and the deceleration ratios of the remaining spur gears are the same as those described above. In this case, the entire spur gear transmission mechanism unit has a deceleration ratio of 96. Accordingly, when the wrist inner frame driving motor 21 has the maximum number of revolutions of 5000 rpm, the rotational axis J5 can have a maximum speed of 270 deg/sec. In the second deceleration ratio structure compared to the first deceleration ratio structure, while the maximum speed is reduced to 1/1.5, the output torque can be up to 1.5 times. Accordingly, in the present invention, it will be understood that both the first and the second deceleration ratio structures can have an optimum deceleration ratio.

ADVANTAGEOUS EFFECTS OF THE INVENTION

In the first aspect, the deceleration ratio can be changed only with the addition of the additional auxiliary shaft supported by the support member, the first additional spur gear, and the second additional spur gear. In other words, only with the addition of the minimum necessary components, the two different deceleration ratios can be obtained without changing the wrist machine frame.

In the second aspect, the output shaft of the wrist inner frame driving motor and the additional auxiliary shaft are arranged in the common through hole. Accordingly, the additional auxiliary shaft can be extremely easily installed while maintaining the advantageous effects described above.

In the third aspect, both the first and the second deceleration ratio structures can have an optimum deceleration ratio.

While the present invention has been described using the typical embodiments, it will be understood by those skilled in the art that the above-described changes and other various changes, omissions, and additions can be made without departing from the scope of the present invention.

What is claimed is:

1. A wrist structure unit connected to a tip of an arm of a robot and having a plurality of degrees of operational freedom, the wrist structure unit comprising:
   a wrist housing machine frame that forms different wrist chambers separated from each other in a wrist machine frame;
   a wrist inner frame that is rotatably retained in a first one of the wrist chambers;
   a wrist inner frame driving motor that is arranged in a second one of the wrist chambers such that an output shaft of the motor is parallel to a rotational axis of the wrist inner frame and drives the wrist inner frame;
   a driving motor different from the wrist inner frame driving motor, the driving motor being housed in the wrist inner frame and outputting a rotational output orthogonal to the rotational axis of the wrist inner frame;
   a cover that covers one side of the wrist housing machine frame to form a decelerator chamber; and
   a spur gear deceleration mechanism unit that is arranged in the decelerator chamber and includes a multi-stage spur gear train for decelerating and transmitting rotational power applied from the output shaft of the wrist inner frame driving motor to the wrist inner frame,
   the spur gear deceleration mechanism unit being adapted to be driven in a first deceleration ratio structure or a second deceleration ratio structure, wherein
   in the first deceleration ratio structure, the wrist inner frame driving motor is attached to a first attachment position in the second wrist chamber;
   the first deceleration ratio structure is adapted to use at least a first spur gear attached to the output shaft of the wrist inner frame driving motor and a second spur gear rotatably supported by a first auxiliary shaft attached to the wrist housing machine frame, having a larger diameter than the first spur gear, and engaged with the first spur gear;
   in the second deceleration ratio structure, the wrist inner frame driving motor is attached to a second attachment position, which is located farther from the wrist inner frame than the first attachment position, in the second wrist chamber;
   the second deceleration ratio structure is adapted to use at least the first spur gear, a first additional spur gear rotatably supported by an additional auxiliary shaft supported by a support member between the output shaft of the wrist inner frame driving motor and the first auxiliary shaft, having a larger diameter than the first spur gear, and engaged with the first spur gear, and a second additional spur gear rotatably supported integrally with the first additional spur gear by the additional auxiliary shaft, having a smaller diameter than the first additional spur gear, and engaged with the second spur gear;
   in the second deceleration ratio structure, the output shaft of the wrist inner frame driving motor and the additional auxillary shaft are arranged in a common single through hole passing through the wrist housing machine frame of the wrist machine frame; and
   the support member includes a flat portion retaining the wrist inner frame driving motor, an opening portion, through which the output shaft of the wrist inner frame driving motor passes, is formed on the flat portion.

2. The wrist structure unit according to claim 1, wherein the first deceleration ratio structure comprises a three-stage spur gear train and the second deceleration ratio structure comprises a four-stage spur gear train.

* * * * *